United States Patent
Lam

(10) Patent No.: US 7,306,201 B2
(45) Date of Patent: Dec. 11, 2007

(54) GATE VALVE WITH TONGUE AND GROOVE OR BRIDGING SEAL TO ANNULAR SEAT ELEMENTS

(75) Inventor: Tony M. Lam, Edmonton (CA)

(73) Assignee: Stream-Flo Industries, Ltd., Edmonton (CA)

(*) Notice: Subject to any disclaimer, the term of this patent is extended or adjusted under 35 U.S.C. 154(b) by 0 days.

(21) Appl. No.: 11/205,751

(22) Filed: Aug. 17, 2005

(65) Prior Publication Data

US 2006/0038155 A1   Feb. 23, 2006

Related U.S. Application Data

(60) Provisional application No. 60/603,389, filed on Aug. 20, 2004, provisional application No. 60/619,765, filed on Oct. 18, 2004.

(51) Int. Cl.
*F16K 25/00* (2006.01)
(52) U.S. Cl. .................. 251/195; 251/327; 251/328
(58) Field of Classification Search ................ 251/170, 251/190, 195, 326, 327, 328, 359
See application file for complete search history.

(56) References Cited

U.S. PATENT DOCUMENTS 3,929,316 A   12/1975   Guthrie (Continued)

FOREIGN PATENT DOCUMENTS

| GB | 6539 | 0/1914 |
|---|---|---|
| GB | 722922 | 2/1955 |

OTHER PUBLICATIONS

Undated trade sales and information brochure for Cameron FL, FLS, and FLS-R Gate Valves.

(Continued)

*Primary Examiner*—Gregory Huson
*Assistant Examiner*—John K. Fristoe, Jr.
(74) *Attorney, Agent, or Firm*—Greenlee Winner and Sullivan, PC

(57) ABSTRACT

A gate valve for controlling fluid flow, in which a valve body forms a cylindrical flowbore and includes a gate cavity intersecting the flowbore to provide opposed openings into the flowbore. Seat pockets are formed in the opposed openings, each with a radial base and a side wall, and may optionally include metal carrier ring sealed in the seat pockets. The gate is slidably movable within the valve body between open and closed positions. Annular seat elements are mounted in each seat pocket for limited axial movement on opposite sides of the gate, with a first seal surface for sealing against the seat pocket or optional carrier ring, and a second seal surface for sealing against the gate. A non-metallic bridging seal formed as a face seal is provided between the first seal surface of the annular seat element and the seat pocket (or optional carrier ring). The bridging seal is adapted to bridge any gap formed at the first seal surface of the annular seat element such that sealing engagement is maintained across the gap at all times as the gate moves between open and closed positions, while still permitting the limited axial movement of the annular seat element. Preferred embodiments of the bridging seal include tongue and groove seals and bridge ring inserts. A second seal to the seat pocket is also preferred.

14 Claims, 13 Drawing Sheets

U.S. PATENT DOCUMENTS

| | | |
|---|---|---|
| 3,993,285 A | 11/1976 | Conley |
| 4,055,325 A | 10/1977 | Vyvial |
| 4,113,233 A | 9/1978 | Bond |
| 4,136,710 A | 1/1979 | Bond |
| 4,155,536 A | 5/1979 | Saiki |
| 4,208,035 A | 6/1980 | Alvarev et al. |
| 4,258,743 A | 3/1981 | Dare et al. |
| 4,364,544 A * | 12/1982 | Kim .......................... 251/328 |
| 4,629,161 A | 12/1986 | Jones et al. |
| 4,643,395 A | 2/1987 | Williams, Jr. |
| 4,645,179 A | 2/1987 | Ali |
| 4,741,509 A | 5/1988 | Bunch et al. |
| 4,824,074 A | 4/1989 | Baugh |
| 4,878,651 A | 11/1989 | Meyer |
| 5,029,812 A | 7/1991 | Haynes |
| 5,083,582 A | 1/1992 | Lawson |
| 5,192,051 A | 3/1993 | Roberson |
| 5,346,179 A | 9/1994 | Lochmann |
| 5,727,775 A | 3/1998 | Rodger et al. |
| 5,730,419 A | 3/1998 | Williams et al. |
| 5,762,320 A | 6/1998 | Williams et al. |
| 6,260,822 B1 | 7/2001 | Puranik |
| 6,279,875 B1 | 8/2001 | Chatufale |
| 6,401,747 B1 | 6/2002 | Cain et al. |
| 6,664,572 B2 | 12/2003 | Chatufale |
| 7,004,452 B2 * | 2/2006 | Chatufale .................. 251/171 |

OTHER PUBLICATIONS

Undated trade sales and information datasheet for Bel Valves Thro Conduit Gate Valves.

Undated trade sales and information brochure for FMC Surface Wellheads 100 Series Gate Valves (models 110, 120, 130, 140).

FMC Surface Wellheads (visited Jan. 10, 2002) "Model 130 Gate Valve" [www document] URL http://fmcwellhead.com/FMC/surface/_surface_product_display_detail_action/1,6562....

* cited by examiner

GATE VALVE WITH TONGUE AND GROOVE OR BRIDGING SEAL TO ANNULAR SEAT ELEMENTS

CROSS REFERENCE TO RELATED APPLICATIONS

The present application claims benefit of U.S. Provisional Patent Application No. 60/603,389 filed Aug. 20, 2004, and of U.S. Provisional Patent Application No. 60/619,765 filed Oct. 18, 2004, both of which are incorporated in their entirety herein by reference to the extent not inconsistent herewith.

BACKGROUND OF THE INVENTION

This invention relates to a gate valve with improved seals to the annular seat elements.

The invention provides an improved gate valve of the slab gate valve type which includes floating annular seat elements sealed in counterbores or seat pockets in the flowbore of the valve body. Gate valves of this nature, the problems inherent with fines entering the sealing areas of these gate valves, and the prior art efforts to solve these problems are well reviewed in prior art patents, see for example U.S. Pat. Nos. 4,645,179; 5,029,812; and 5,727,775.

In the slab gate valve design, tight clearances and metal-to-metal sealing surfaces are maintained between the valve body (i.e., seat pockets with optional metal carrier rings), the annular seat element and the gate. However tight the clearances are, gaps exist between all surfaces. The upstream annular seat element (at the inlet) and the gate float downstream (toward the outlet) with the pressure to seal against the downstream annular seat element. Particles smaller than the gap between the sealing surfaces may enter the gap. In most cases, the gate valves are expected to flow in one direction and hold pressure in the opposite direction. Over time, particles can get in between all surfaces and eventually produce leakage.

SUMMARY OF THE INVENTION

The seat seal arrangement of the present invention is designed to provide a non-metallic bridging seal which is formed as a face seal which bridges any gap between the annular seat elements and either the radial base of the seat pocket, or an optional metal carrier ring which might be sealed in the seat pocket. The bridging seal is adapted such that sealing engagement is maintained across this gap at all times as the gate is moved between the open and closed positions, while still permitting the limited axial movement of the annular seat element.

In some embodiments, this bridging seal takes the form of a tongue and groove seal. The tongue may be formed by machining the face of the seat pocket or an optional metal carrier ring seated in the seat pocket, to provide an annular lip. Alternatively, the tongue may be formed as an annular lip on the seal surface of the annular seat elements facing the seat pocket. A generally U-shaped non-metallic ring seal is tightly engaged with the tongue, the U-shaped ring seal being carried in an annular groove in the member opposite the tongue. This tongue and groove sealing engagement is maintained even as the annular seat element and the gate move from side to side (i.e., along the linear axis of the annular seat elements) under pressure as the gate is opened or closed. Preferably, a second non-metallic ring seal to the annular seat elements is provided. This second seal may be located along the seal surface of the annular seat element (i.e., a face seal), at or adjacent the periphery of the seal surface of the annular seat element (i.e., a corner seal), or at the outside diameter of the annular seat element (i.e., an outside diameter seal).

In other embodiments, the non-metallic bridging seal is provided as a non-metallic bridge ring insert held in grooves between the first seal surface of each annular seat element and, either the radial base of the seat pocket, or the carrier ring if present. More particularly, this type of bridging seal includes a) a first annular groove formed either on the first seal surface of the annular seat member or, on the radial base or carrier ring if present, b) a second annular groove formed in the member opposite the first annular groove, the second annular groove being aligned with the first annular groove, and c) a non-metallic bridge ring insert held in each of the first and second annular grooves so as to bridge a gap at the first seal surface such that sealing engagement is maintained across said gap at all times as the gate is moved between the open and closed positions.

Broadly stated, the invention provides a gate valve for controlling fluid flow, which includes:
a) a valve body forming a cylindrical flowbore extending through the body and a gate cavity intersecting the flowbore to provide opposed openings into the flowbore, the valve body forming a seat pocket in each of the opposed openings, each seat pocket having a radial base and a side wall;
b) an optional metal carrier ring mounted in sealing relationship to the valve body in each seat pocket;
c) a gate slidably movable across the flowbore within the valve body between an open and closed position, and having a planar face on each side;
d) an annular seat element mounted in each seat pocket for limited axial movement therein on opposite sides of the gate, each seat element forming a first seal surface for sealing against the radial base of the seat pocket or against the carrier ring if present, and a second seal surface for sealing against the planar face of the gate, the annular seat element maintaining sealing engagement between the gate and the seat pocket, or the carrier ring if present, as the gate is moved between its open and closed positions; and
e) a non-metallic bridging seal formed as a face seal between the first seal surface of each annular seat element and, either the radial base of the seat pocket, or the carrier ring if present, said bridging seal being adapted to bridge any gap formed at the first seal surface of the annular seat element such that sealing engagement is maintained across said gap at all times as the gate is moved between the open and closed positions, while still permitting the limited axial movement of the annular seat element.

In embodiments in which the non-metallic bridging seal takes the form of one or more tongue and groove seals, this may be provided by:
one or more annular lips (tongues) formed on either the radial base of the seat pocket, or the carrier ring if present, an annular groove provided in the first seal surface of the annular seat element opposite each annular lip; and a generally U-shaped ring seal seated in each annular groove for receiving the annular lip; and/or
one or more annular lips (tongues) formed on the first seal face of the annular seat element, an annular groove formed in either the radial base of the seat pocket, or the carrier ring, if present, opposite each annular lip; and a generally U-shaped ring seal seated in each annular groove for receiving the annular lip.

In preferred embodiments, each tongue of the one or more tongue and groove seals extends into the annular groove with a depth that is greater than the limited axial movement permitted by the sum of all the gaps along the flowbore axis of the annular seat elements between the gate, the annular seat elements, the seat pockets and the carrier metal rings, if present.

In preferred embodiments the second ring seal (i.e., further to the tongue and groove or bridging seal) is formed between the annular seat elements and either the seat pockets or the carrier rings if present. The annular seat elements are formed with a central bore aligned with the flowbore of the valve body, such that the first seal surface of the annular seat element has a periphery edge opposite its flowbore edge, and the second ring seal is formed: i) as a corner seal at or adjacent the periphery edge of each annular seat element, ii) as a face seal on the first seal surface of the annular seat element, or iii) as an outside diameter seal at the outside diameter of the annular seat element.

While the second seal ring may take any of the forms known in the art, preferred embodiments of the invention, illustrate the second seal as an O-ring seal formed as a) a corner or outside diameter seal, and b) as a second tongue and groove seal formed as a corner seal or face seal.

DETAILED DESCRIPTION OF THE INVENTION

Figure 1:
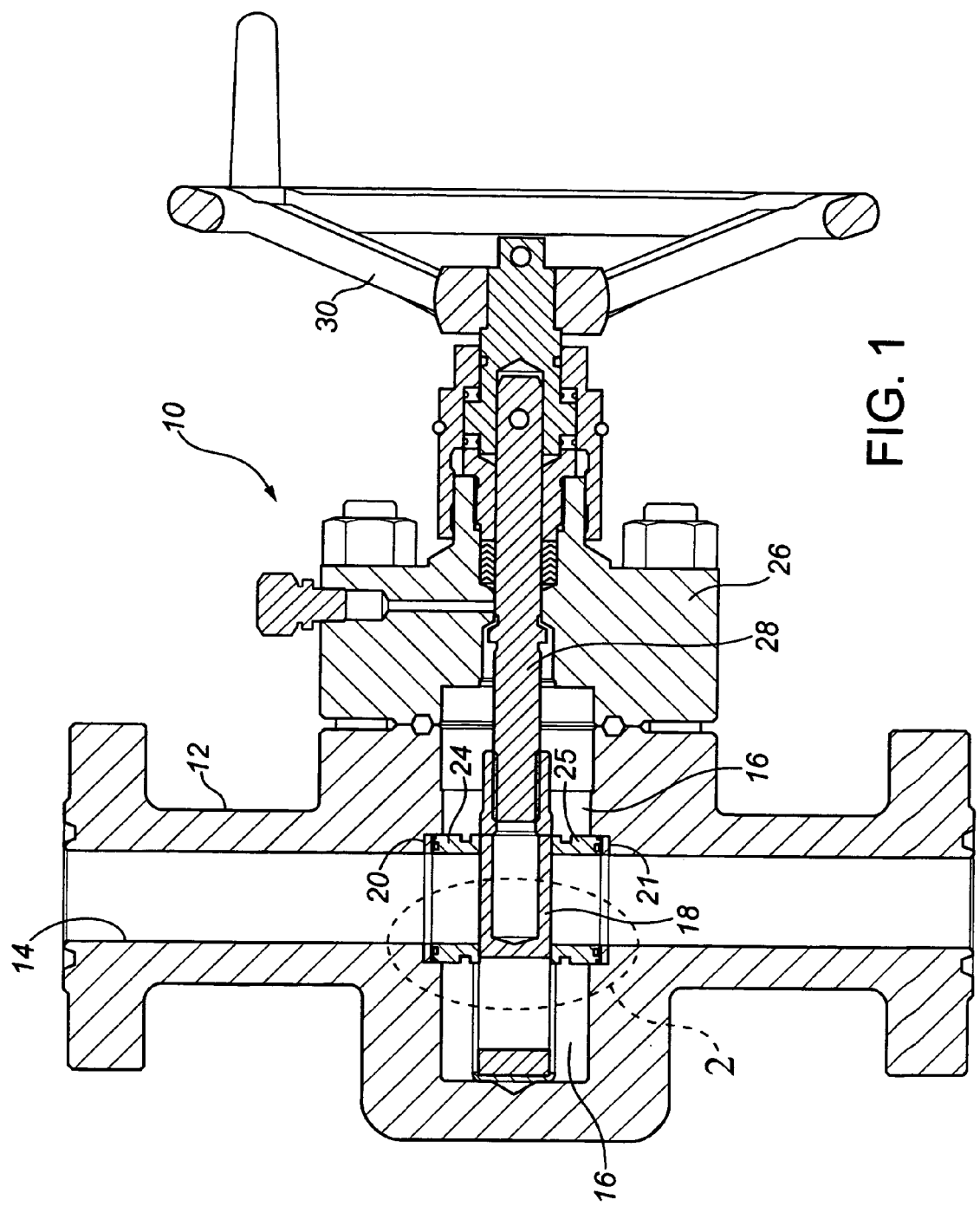
FIG. 1 is a side sectional view of the gate valve of the present invention, showing the annular seat elements sealed in seat pockets of the valve body.

As used herein and in the claims, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements. Thus, for example, the terms "a tongue" and "a groove" are intended to include embodiments with multiple tongue and grooves.

As used herein and in the claims, the terms "side to side"; "side"; "upstream"; and "downstream" and other like terms indicating relative positions above or below or to the side of a given point or element are used in this description to more clearly describe some embodiments of the invention. However, when applied to apparatus and methods for use in wellheads, such terms may refer to a left to right, right to left, up or down or other relationship as appropriate.

As used herein and in the claims, the term "generally U-shaped ring seal" is meant to include ring seals which are generally U-shaped in cross section, with generally U-shaped including not only the strict U-shaped ring seals shown in the Figures, wherein both the outer and inner surfaces of the ring seal have general right angled U-shaped profile, but also ring seals having more generally rounded or tapered outer and/or inner surfaces. In general the outer surface of the ring seal is shaped to form a close fit with the particular geometry of the annular groove formed to retain it, and the inner surface is shaped to form a close fit with the particular geometry of the tongue member so as to create a tongue and groove sealing relationship between the U-shaped ring seal and the tongue member. The term "generally U-shaped ring seal" also extends to ring seals which provide multiple generally U-shaped grooves, such as a double U-shaped ring seal, adapted to receive multiple tongue members.

"Limited axial movement" when used herein and in the claims refers to the amount of movement that is permitted along the linear axis (flowbore axis) of the annular seat elements as the upstream annular seat element and the gate float downstream to seal the downstream annular seat element in its seat pocket. This limited amount of movement is the sum of all the "gap" or "clearance" along this axis between the valve body seat pocket (or carrier metal rings if present), the annular seat elements and the gate.

"Face seal" when used herein and in the claims refers to a seal formed only between two parallel planar facing surfaces, for instance between the first seal surface of the annular seat elements and the radial base of the seat pockets. A "face seal" when used herein and in the claims is not meant to include an edge or corner sealing function to another non-parallel surface, rather a "face seal" is formed only to a facing and parallel surface.

"Corner seal" when used herein and in the claims refers to a seal to the perpendicular surfaces forming the corner being sealed.

Having reference to FIG. 1, the gate valve of this invention is shown generally at 10 to include a pressure containing valve body 12, which is flanged for connection with pressure tight seals to other wellhead components (not shown). Alternate connections apart from flange connections may be used as is known in the art. The valve body 12 forms a central cylindrical flowbore 14 which extends there through. A gate cavity 16 which intersects the flowbore 14, is also formed in the valve body 12. One end of the gate cavity 16 is closed by the wall of the valve body 12, while the other end is open to the exterior. A gate 18 is mounted for sliding movement across the flowbore 14 between an open and closed position. At each of the opposing openings into the flowbore 14, the valve body 12 forms a preferably right cylindrical counterbore, (termed seat pocket) 20, 21. The seat pockets 20, 21 each have a radial base 22 and a side wall 23. A pair of annular seat elements 24, 25 are mounted within the seat pockets 20, 21 for limited axial movement therein, such that the annular seat element 24 or 25 maintains sealing engagement between the gate 18 and the seat pocket 20 or 21 as the gate 18 is moved between its open and closed positions.

Attached in sealing relationship to the valve body 12 at the open end of the gate cavity 16 is a bonnet 26. A gate stem 28 is fastened at one end to the gate 18 and at its other end to a valve operator, such as a manual crank 30 for moving the gate 18 between its open and closed positions. The gate stem 28 is sealed within the bonnet 26, in a manner as is well known in the art.

Figure 9:
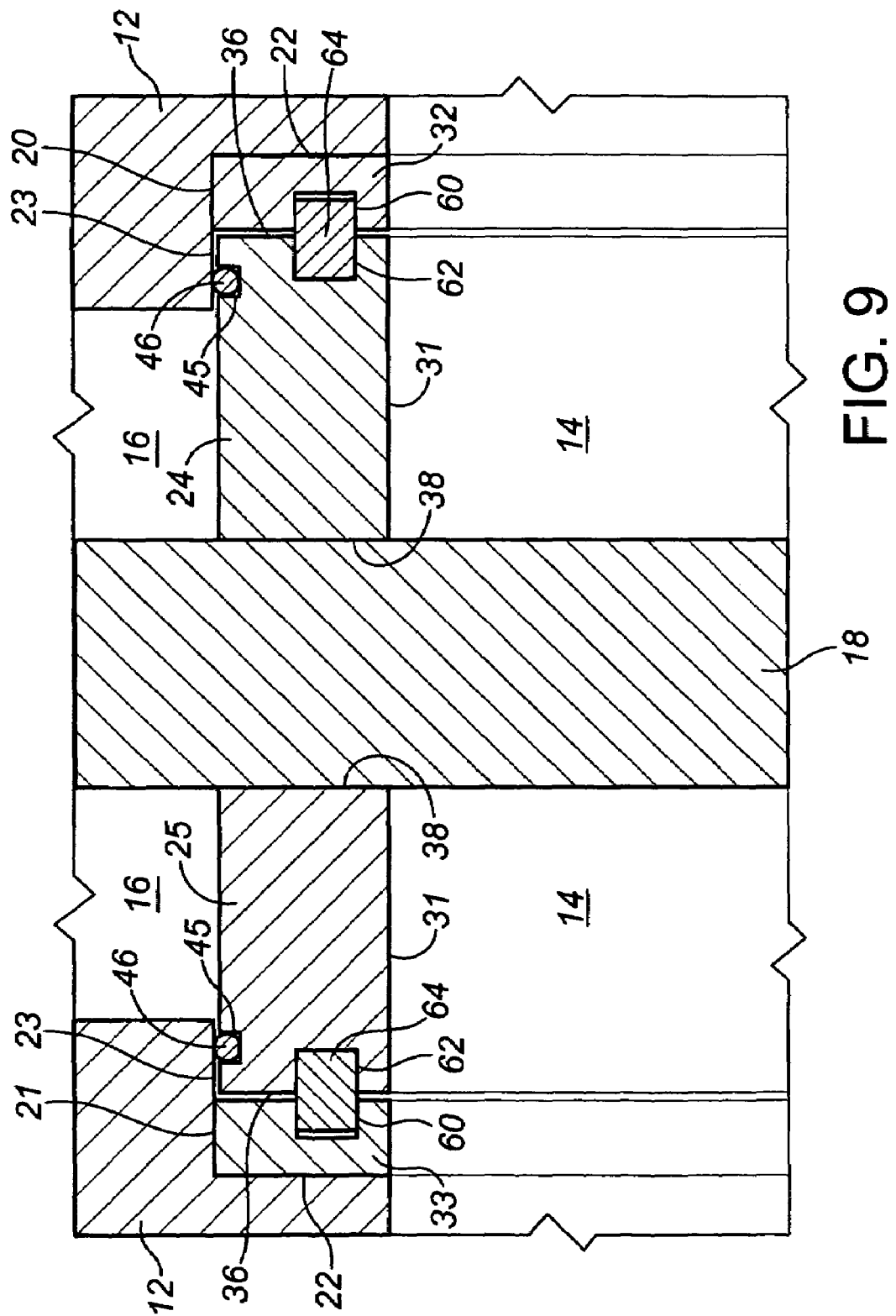
FIG. 9 is a side sectional view of the same area as FIG. 2, wherein a non-metallic bridging seal is provided as a face seal between the annular seat element and the carrier ring.
Figure 10:
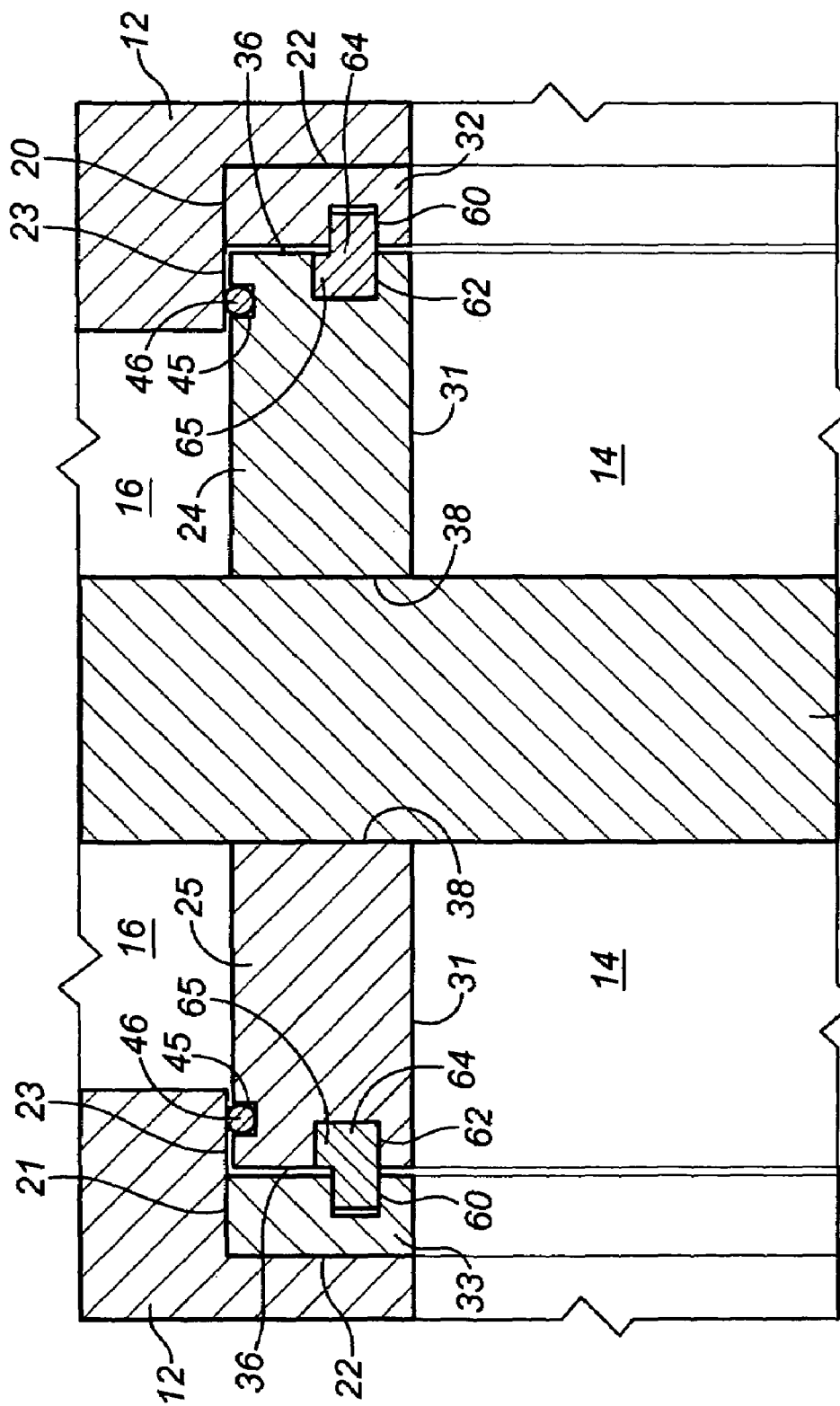
FIG. 10 is a side section view of the same area as FIG. 2, wherein a non-metallic bridging seal is provided as a face seal between the annular seat element and the carrier ring, but differing from FIG. 9 in that the one of the annular grooves is radially larger than the other, with the bridge ring insert being likewise radially larger.
Figure 11:
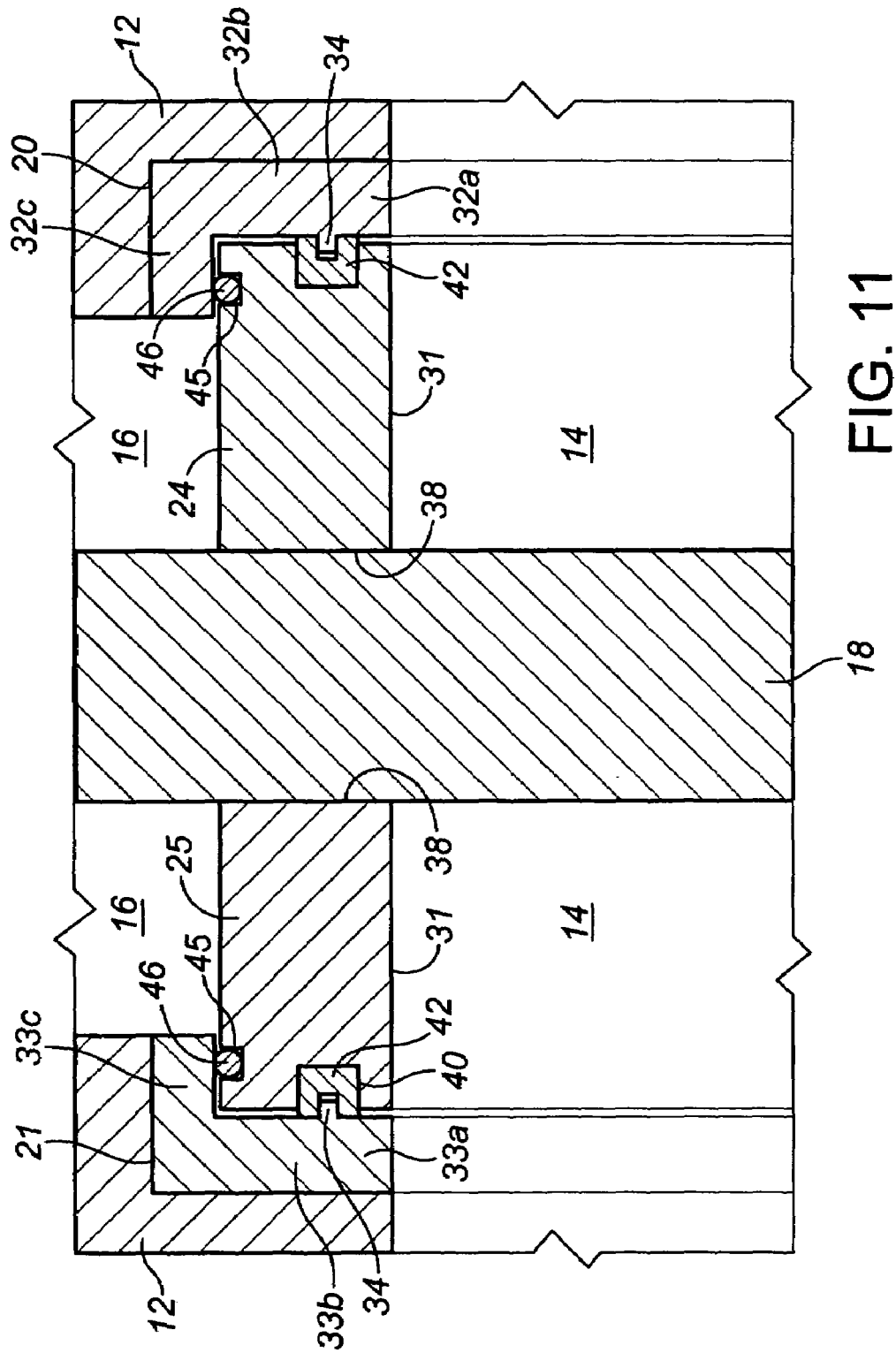
FIG. 11 is a side section view of the same area as FIG. 2, wherein the carrier ring is right cylindrical in its cross section for a tight interference fit within the right angled cylindrical counterbore (seat pocket) of the valve body, and wherein the second seal is an outside diameter seal to the side wall of the carrier ring.

Turning to the annular seat elements 24, 25, FIGS. 2-8, 11, 12 and 13 show multiple preferred embodiments of the invention wherein two non-metallic seals are provided for the annular seat elements 24, 25. The first is a tongue and groove seal (single or multiple) formed as a face seal on the seat pocket facing surface of the annular seat elements 24, 25. The second seal is an optional, but preferred, and is formed at various locations close to the periphery 44 (outside edge facing the corner of the seat pockets 20, 21, i.e., opposite the flowbore edge) of the annular seat elements 24, 25. FIGS. 9 and 10 illustrate a non-metallic bridge seal insert 64 for the annular seat elements 24, 25 in place of the tongue and groove seal shown in the other figures. FIGS. 2-12 are generally schematic in detail to illustrate the tongue and groove or bridging seal feature of the present invention, other features of the gate valve of this invention being well understood and variable by persons skilled in the art. The annular seat elements 24, 25 are generally formed from a suitable metal such as carbon or alloy steels, or solid carbides. Wear resistant coatings may be formed thereon as is known in the art. The annular seat elements 24, 25 are formed with a central bore 31 which is generally aligned with the flowbore 14.

Figure 12:
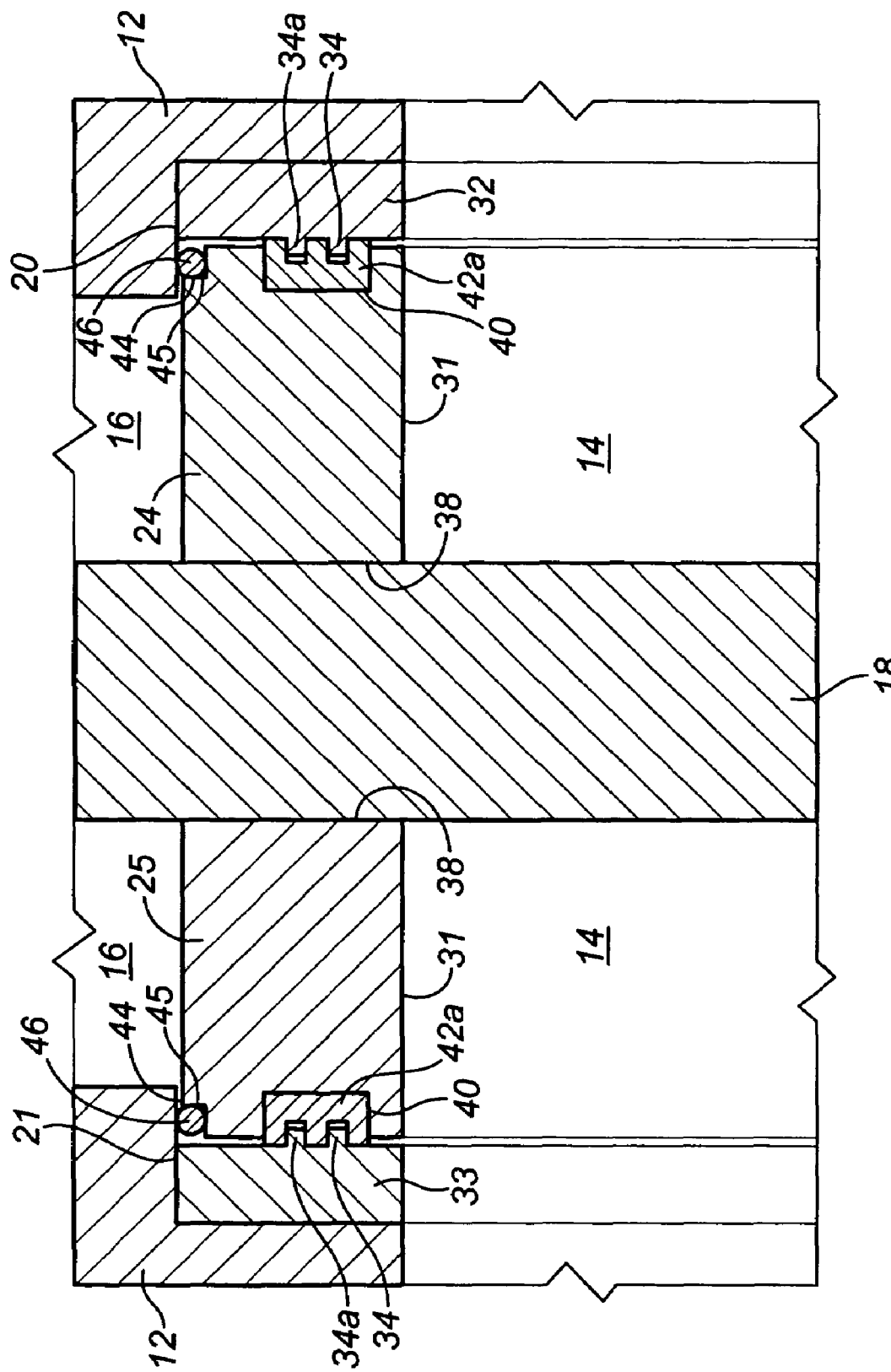
FIG. 12 is a side section view of the same area as FIG. 2, showing features similar to those shown in FIG. 2, but wherein the generally U-shaped ring seal provides multiple grooves (here a double U-shaped ring seal) to accept multiple tongues on the adjacent carrier ring and thus provide multiple tongue and groove seals.
Figure 13:
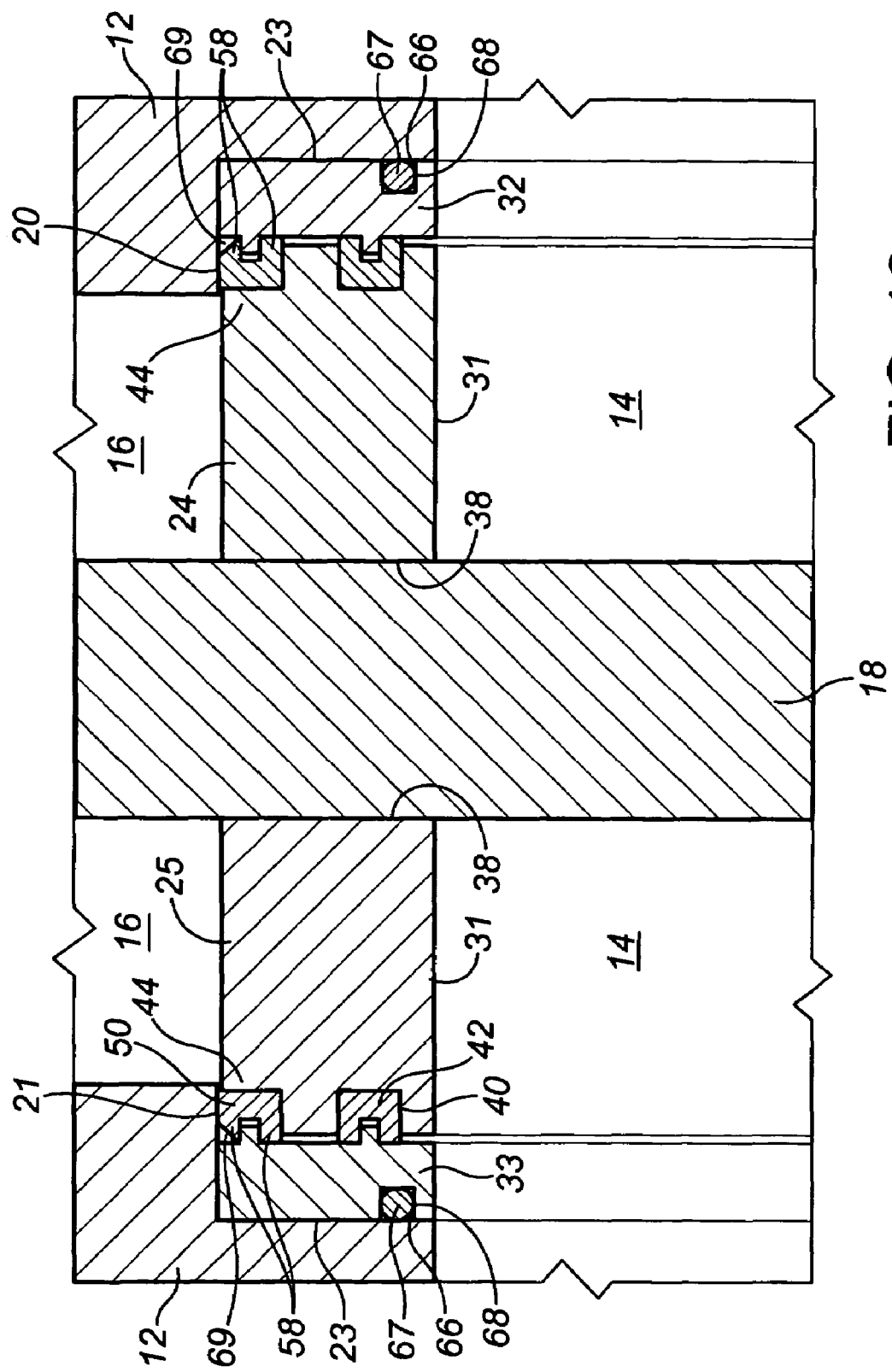
FIG. 13 is a side section view of the same area as FIG. 2, showing features similar to those shown in FIG. 5, but wherein an O-ring seal to the seat pocket is added and wherein the second tongue and groove seal located as a corner seal has a cut-away portion of one of the legs to assist in pressure equalization in this area during any sudden pressure drop across the valve.

In FIGS. 2, 3, 5-13 optional metal carrier rings 32, 33 are mounted in the seat pockets 20, 21 respectively, for sealing relationship with the valve body 12. A metal to metal seal is provided by virtue of an interference fit between the metal carrier ring 32, 33, the radial base 22 and the side walls 23 of the seat pockets 20, 21. As seen in the FIGS., the flowbore 14 is generally aligned through both the annular seat elements 24, 25 and the metal carrier rings 32, 33 as is known in the art. The metal carrier rings 32, 33 may be formed from suitable metals such as carbon or alloy steels, as is known in the art. In FIGS. 2, 3, 5-10, and 12, the carrier rings 32, 33 are shown to be annular shaped rings, while in FIG. 11, the carrier rings (labeled as 32a and 33a) are shown to be right cylindrical (in cross section), having an annular base 32b, 33b and a side wall 32c, 33c for a tight interference fit in the right cylindrical seat pockets 20, 21 respectively. In the description below, the reference to the carrier rings 32, 33 applies equally to carrier rings 32a, 33a. In FIG. 13, an optional ring seal 66 is shown between the carrier rings 32, 33 and the radial base 22 of the side walls 23 of the seat pockets 20, 21. This ring seal 66 is shown as an O-ring 67 held within an annular groove 68 formed in the carrier rings 32, 33. However, other ring seal types may be used, as is known in the art. This ring seal 66 prevents the carrier rings from being displaced from the seat pockets 20, 21.

The Tongue and Groove Seal

In accordance with the present invention, one or more tongue and groove seals, described more fully hereinbelow, is formed between the annular seat elements 24, 25 and either the radial base 22 of the seat pocket 20, 21, or the metal carrier ring 32, 33 if present. In each FIGS. 2-8, 11 and 12 the tongue of each tongue and groove seal is formed either on the radial base 22, or on the metal carrier ring 32, 33, if present. However, it should be understood that this feature can be reversed, such that the tongue can be formed by the annular seat elements 24, 25, without departing from the present invention. The gate valve 10 of the present invention preferably includes a second seal (i.e., further to the tongue and groove seal), described more fully hereinbelow, formed at or adjacent the periphery of the annular seat elements 24, 25 so as to form a corner, or formed as a face or outside diameter seal, with multiple embodiments of this second seal and its location being shown in the FIGS. 2-12.

The radial base 22 of the seat pocket 20, 21, or the gate-facing surface of the metal carrier ring 32, 33 if present, is formed with a gate-facing annular lip 34 which serves as the tongue in the tongue and groove sealing arrangement of this invention. The seat-facing surface 36 of the annular seat elements 24, 25, also termed the first seal surface, seats and seals against the radial base 22 of the seat pockets 20, 21, or against the carrier metal ring 32, 33, if present. The gate-facing surface 38 of the annular seat elements 24, 25 forms a second seal surface (opposing the first seal surface) for sealing against the gate 18. The first seal surface 36 of the annular seat elements 24, 25 is formed with an annular groove 40, sized to accept a generally U-shaped non-metallic ring seal 42. The ring seal 42 extends beyond the annular groove 40, so as to protect the radial base 22 and first seal surface 36 when the annular seat element 24 or 25 is forced with pressure against the radial base 22, or the carrier metal ring 32 or 33 if present. The groove 40 and ring seal 42 are located to mate in tongue and groove sealing arrangement with the annular lip 34.

Figure 5:
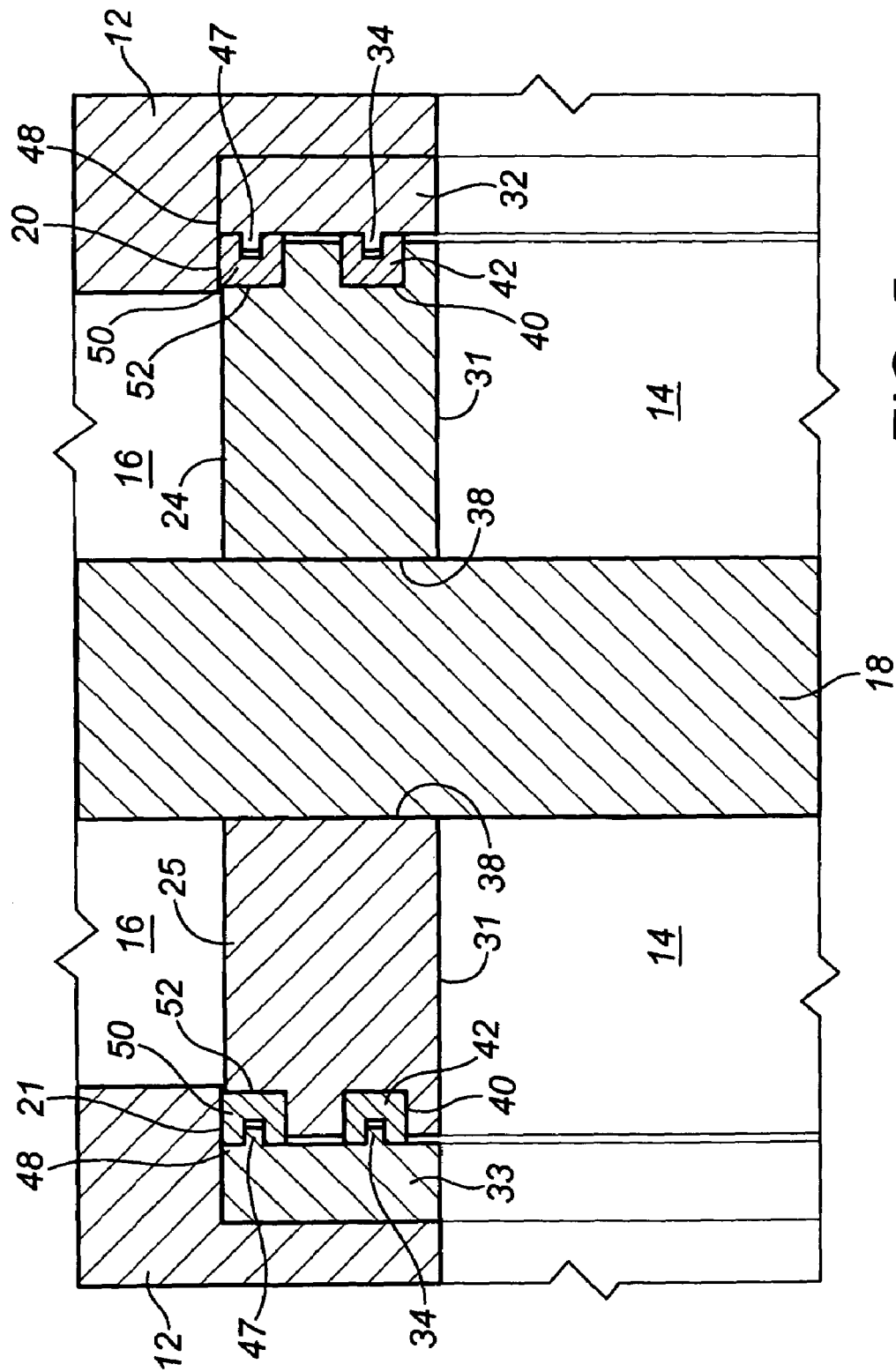
FIG. 5 is a side section schematic view of the same area as FIG. 2, wherein the second seal is provided by a tongue and groove seal located at the periphery of the annular seat elements to provide a corner seal with a generally U-shaped ring seal.
Figure 7:
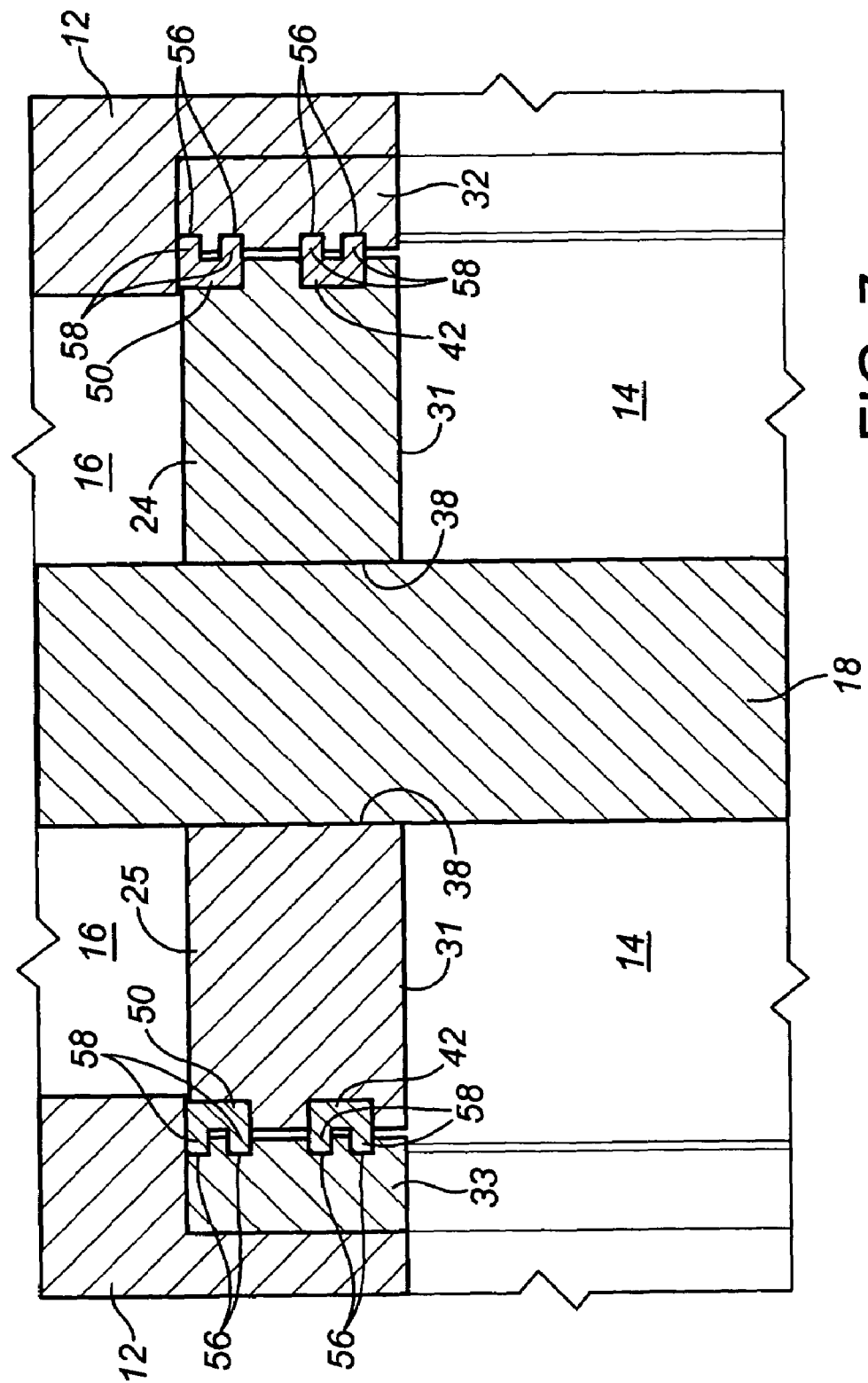
FIG. 7 is a side sectional schematic view of the same area as FIG. 2, with features similar those in FIG. 5, but wherein the leg portions of the generally U-shaped ring seals of both of the tongue and groove seals extend into grooves in the metal carrier ring.
Figure 8:
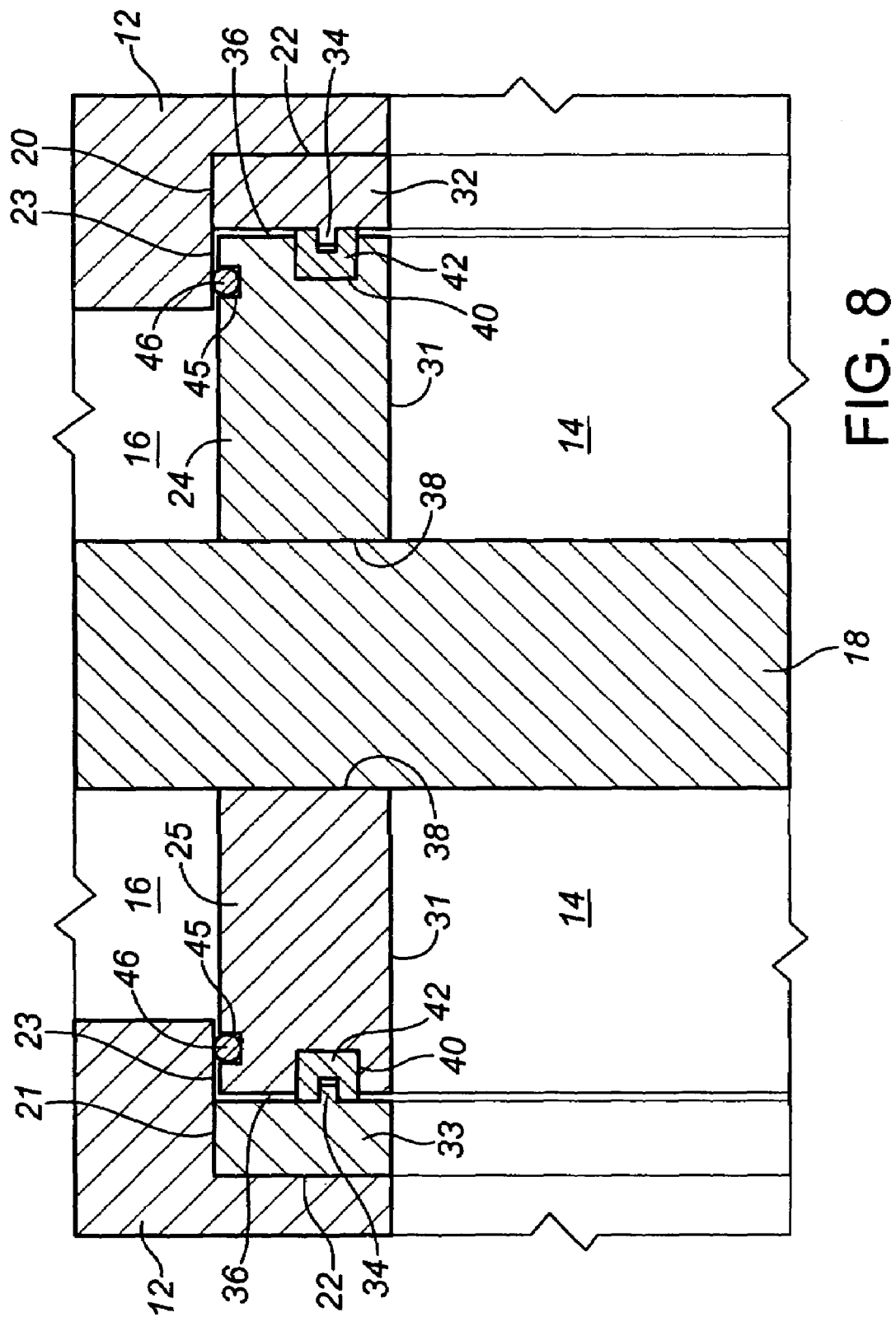
FIG. 8 is a side section schematic view of the same area as FIG. 2, wherein the second seal is an outside diameter seal provided by an O-ring seal located on the outside diameter of the annular seat element to seal against the side wall of the seat pocket.

FIG. 7 shows a further embodiment of the double tongue and groove seals of FIG. 5, in which the gate facing surface of the metal carrier rings 32, 33 are formed with secondary annular grooves 56, positioned to accept the leg portions 58 of the generally U-shaped ring seals 42, 50. This preferred embodiment further enhances the exclusion of fines from the tongue and groove seals, and enhances the protection of the first seal surface 36 of the annular seat elements 24, 25. This embodiment ensures that the annular seat elements 24, 25 always remain in engagement with the tongue member of any of the tongue and groove seals to exclude fines and to protect the first seal surface 36. Stated in another way, this embodiment ensures that any gap to the annular seat elements 24, 25 is always bridged to exclude fines as the gate is opened or closed.

In FIG. 12, a multiple tongue and groove seal is shown with the generally U-shaped ring seal 42a including multiple grooves (shown as a double U-shaped ring seal in the figure) to accept multiple tongues of annular lips 34, 34a.

To maintain the tongue and groove sealing arrangement of the present invention in a manner to exclude fines from entering therein, and to protect the first seal surface 36 of the annular seat elements 24, 25, the depth of the annular lips 34, 34a, 47 (i.e., the depth that the lip extends into the ring seals 43, 50 and 54), is greater than the axial movement that is permitted by the annular seat elements 24, 25, which equates to the sum of all gap in this axis, as described above. As well, as shown in all of the Figures, the tongue is tight fitting in the generally U-shaped or L-shaped ring seals 42, 42a, 50 or 54.

The Second Ring Seal

A second non-metallic seal is preferably provided for the annular seat elements 24, 25. In general, any ring seal known in the art may be used. This second seal is termed a face seal if it is located between the tongue and groove seal described above and the periphery edge 44 of the annular seat elements 24, 25. This second seal may alternately be a corner seal if located at or adjacent the periphery edge 44. This second seal may still alternatively be an outside diameter seal if located on the outside diameter of the annular seat elements 24, 25 for sealing against the side wall 23 of the seat pockets 20, 21 (or against the side wall 32c, 33c of the carrier rings 32a, 33a in FIG. 11). The second seal is formed by providing an annular recess 45 in the annular seat elements 24, 25 at one of these locations, appropriately shaped to accept a second ring seal such as shown in the figures.

Figure 2:
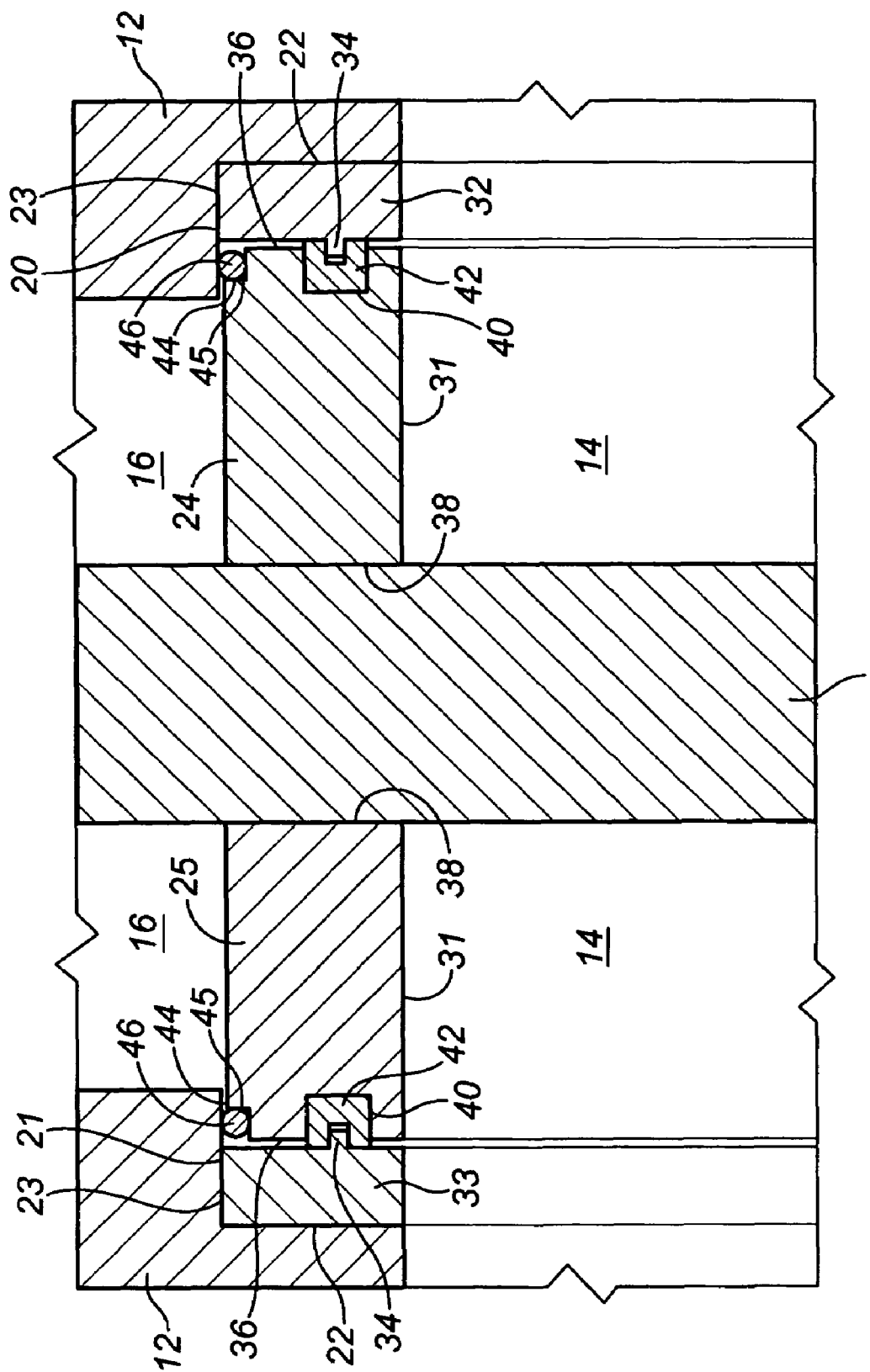
FIG. 2 is a side sectional schematic view showing details of the area marked 2 in FIG. 1 to illustrate one embodiment of the tongue and groove sealing feature forming a face seal. In this embodiment, the tongue is formed on a metal carrier ring, while the groove is formed by a generally U-shaped ring seal carried by the annular seat element. A second seal is provided by an O-ring seal located at the periphery of the annular seat element so as to form a corner seal.
Figure 3:
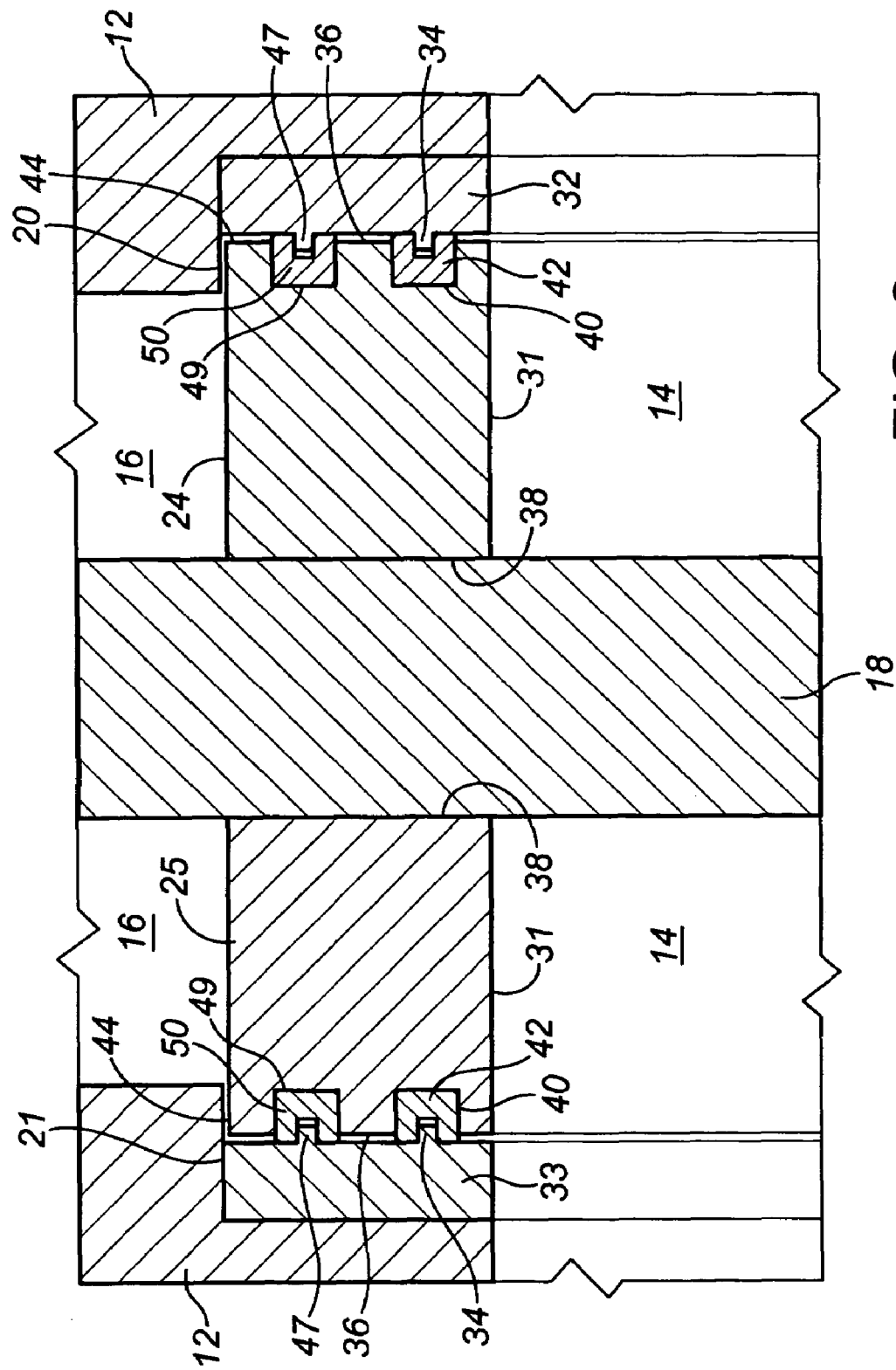
FIG. 3 is a side sectional schematic view of the same area as FIG. 2, wherein the second seal is provided by a second tongue and groove seal located on the face of the annular seat element so as to form a second face seal.
Figure 4:
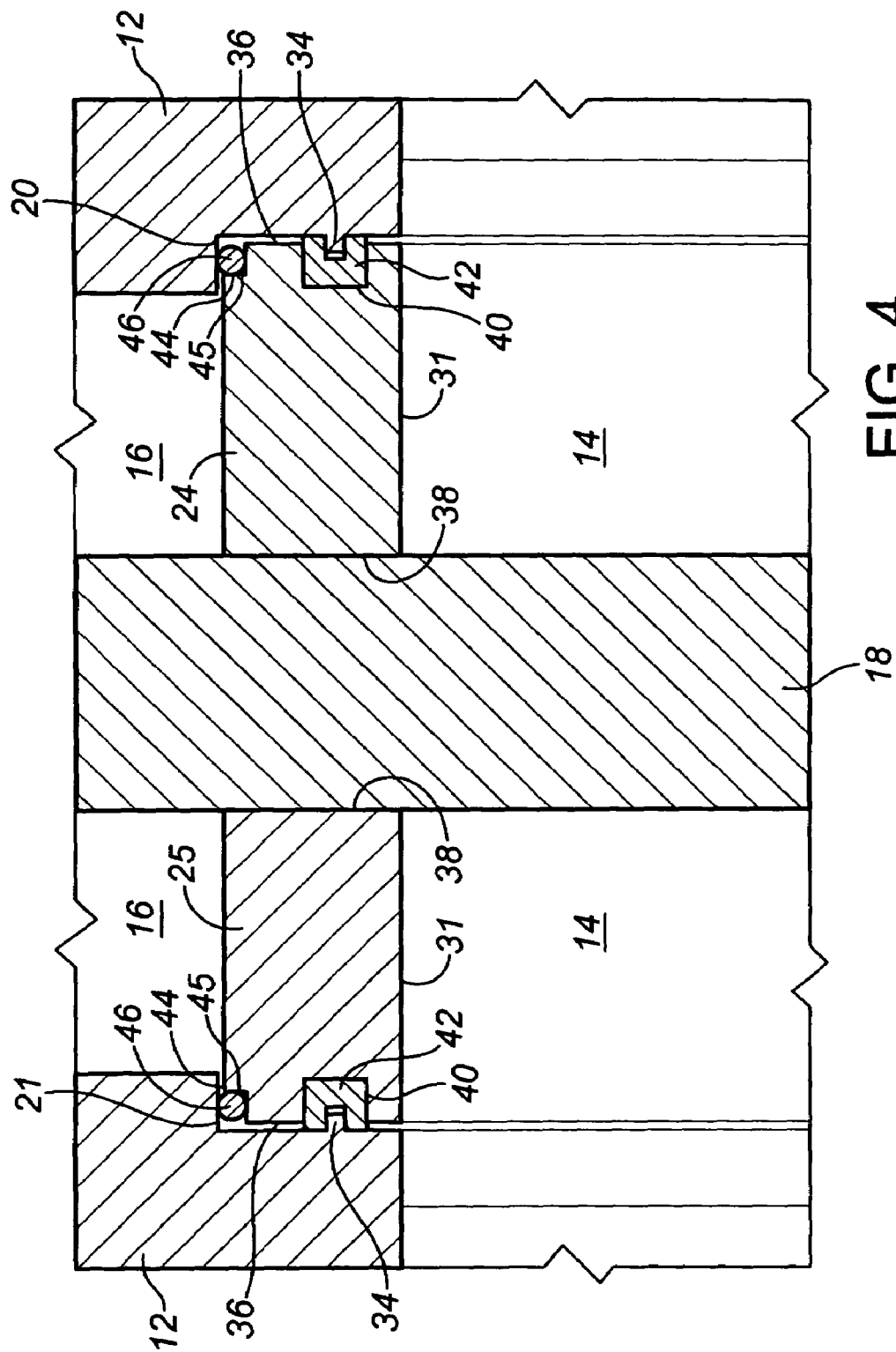
FIG. 4 is a side section schematic view of the same area as FIG. 2, but without the optional metal carrier ring of FIG. 2, such that the tongue is formed by the radial base of the seat pockets.
Figure 6:
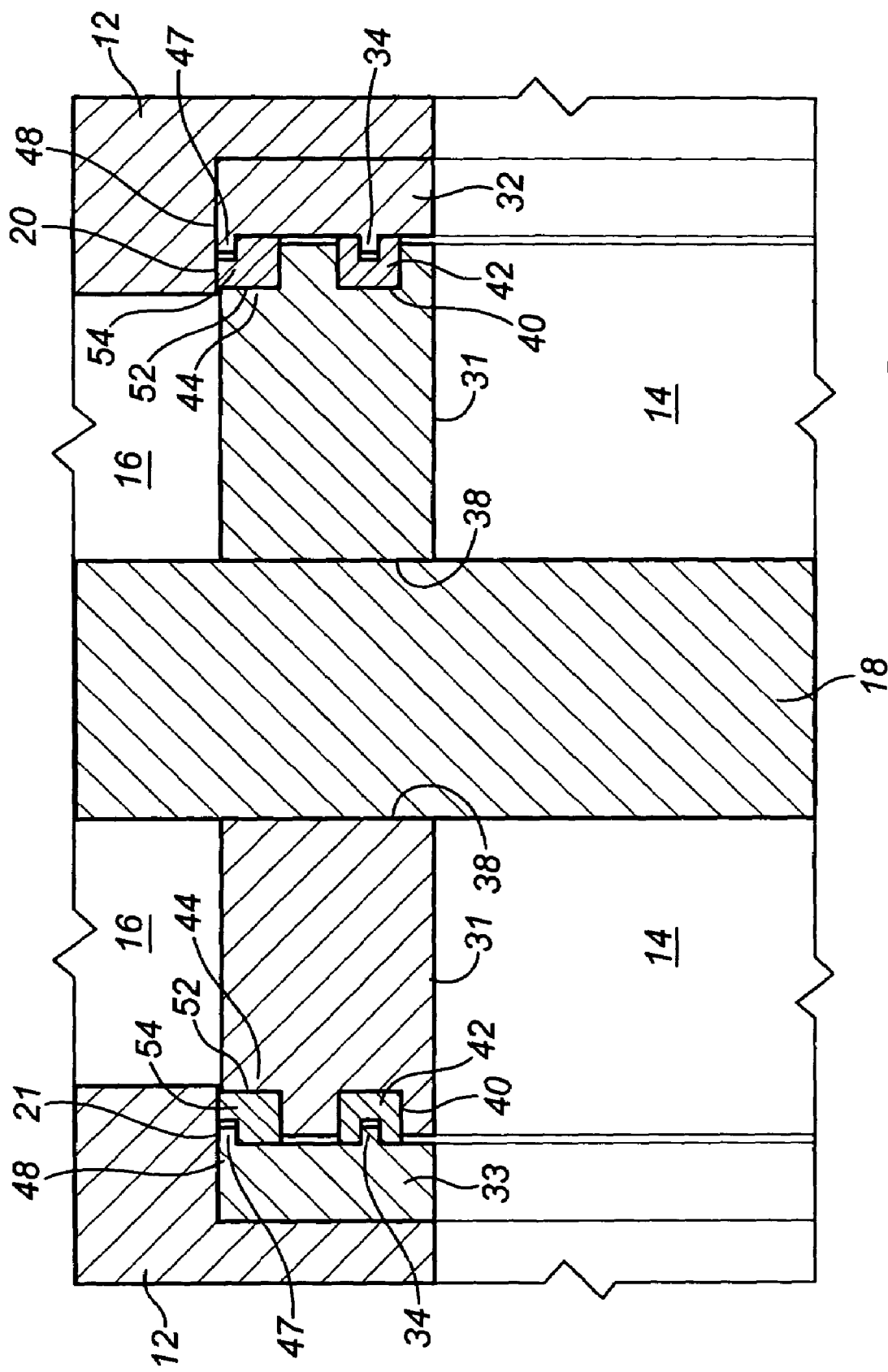
FIG. 6 is a side section schematic view of the same area as FIG. 2, wherein the second seal is provided by a tongue and groove seal located at the periphery of the annular seat element, with a generally L-shaped ring seal.

In the Figures, this second seal is shown in multiple embodiments to provide a face seal (see a second tongue and groove seal in FIG. 3), a corner seal (see FIGS. 2, 4-7, 12 and 13 for either a corner second tongue and groove seal or a corner O-ring seal), or an outside diameter seal (see FIGS. 8, and 9-11 for an O-ring seal held on the outside diameter of the annular seat elements). In general, an O-ring corner seal such as shown in FIG. 2 or 4 might be best suited for relatively low pressure environments, say less than 10,000 psi, while a second tongue and groove seal such as shown in FIGS. 3 and 5, might be best suited for higher pressure environments, say greater than 15,000 psi. FIGS. 2, 4 and 12 show the corner seal to include an O-ring 46 located at the periphery edge 44 of the annular seat elements 24, 25. To provide a second tongue and groove seal in other embodiments, this second seal is formed by providing a second, gate-facing annular lip 47 on the radial base 22 of the seat pockets 20, 21, or on the carrier metal rings 32, 33 if present. This second annular lip 47 may be located at the periphery edge 48 of the metal carrier rings 32, 33 to provide a corner seal as shown in FIGS. 5 and 6, or it may be located between the first tongue and groove seal and the periphery edge 48, as shown in each of FIG. 3. In the embodiments shown in FIG. 3, the annular recess 45 takes the form of a second annular groove 49 which is generally U-shaped, formed on the first seal surface 36. A second generally U-shaped ring seal 50 is provided in the second annular groove 49, the ring seal 50 being sized and located to accept the second annular lip 47 in a tongue and groove sealing arrangement. In the embodiments shown in FIGS. 5 and 6, the annular recess 45 takes the form of a generally L-shaped (in cross section) annular groove 52 at its periphery edge 44. A generally U-shaped ring seal 50 is provided in the groove 52 in FIG. 5, while a generally L-shaped (in cross section) ring seal 54 is provided in the groove 52, the ring seal 54 being sized and located to accept the second annular lip 48 so as to provide a corner seal. In FIGS. 8-10 and 11, the second seal is provided by forming the annular recess 45 in the outside diameter of the annular seat elements 24, 25, and locating the O-ring seal 46 therein. This forms an outside diameter or radial seal between the annular seat elements 24, 25 and the side wall 23 of the seat pockets 20, 21.

In FIG. 13, the second seal is shown to take the form of a corner tongue and groove seal as described above for FIG. 5. In the embodiment shown in FIG. 13, this second seal is weakened slightly, as compared to the first tongue and groove face seal, by having a cut away portion 69 from one of the legs 58 of the U-shaped ring seal 50. This cut away feature 69 is provided to allow pressure build up at the metal-to-metal seal surfaces between the two seals to dissipate more quickly, for instance in the event of a sudden pressure drop across the valve. This has the effect of lowering the operating torque on the gate valve. This second seal will preferably be weakened in this way at a location closest to the periphery 44 of the annular seat elements 24, 25. In the embodiments described above, when the second seal takes the form of an O-ring seal, this seal may be weakened by scoring the ring on its outside sealing surface. To prevent fines from entering the metal to metal sealing surface between the first and second seals, it is preferable to weaken only the second of the seals, and at a location closest to the periphery 44 of the seat elements 24, 25. This feature of weakening the second ring seal is more important on larger valves, where pressure build ups at the metal to metal sealing surfaces become larger due to the greater friction between the surfaces.

The Bridge Ring Insert Seal

FIGS. 9 and 10 show an alternate non-metallic bridging seal embodiment of this invention for use instead of the tongue and groove seal described above. In this embodiment, aligned annular grooves 60, 62 are formed in the carrier rings 32, 33 and in the first seal surface 36 of the annular seat elements 24, 25. A non-metallic bridge ring insert 64 is located in these grooves 60, 62 for sealing engagement across the gap between the carrier rings 32, 33 and the annular seat elements 24, 25. In a manner similar to that described above for the tongue and groove seal, the insert 64 is of held with a sufficient depth within the grooves 60, 62 such that this bridging seal maintains the sealing engagement across this gap at all times as the gate 18 is moved between its open and closed positions, while still permitting the limited axial movement of the annular seat elements 24, 25. This prevents fines from building up in this gap.

In FIG. 10, the annular groove 62 in the annular seat elements 24, 25 is shown to be radially larger than the opposing groove 60 in the carrier rings 32, 33. Likewise, the bridge ring insert 64 is radially larger in the portion 65 which is inserted in the groove 62. In this embodiment, this radially larger portion 65 of the insert 64 provides a non-metallic sealing surface to the portion of the metal carrier ring 32, 33 directly opposed. This radially larger portion 65 of the insert 64 could be provided in the groove 60 on the carrier rings 32, 33 if desired.

The embodiments of FIGS. 9 and 10 are illustrated with the carrier rings 32, 33 present. However, the invention also extends to embodiments with carrier rings are as shown FIG. 11, and to embodiments in which the carrier rings are omitted. In the latter case, the annular groove 60 would be formed in the radial base 22 of the seat pockets 20, 21. A second ring seal may be used with the bridging seal of this invention. Any ring seal known in the art may be used. As above, this second seal may be located as a face seal if it is located between the bridging seal the periphery edge of the annular seat elements 24, 25. This second seal may alternately be a corner seal if located at or adjacent the periphery edge. This second seal may still alternatively be an outside diameter seal if located on the outside diameter of the annular seat elements 24, 25 for sealing against the side wall 23 of the seat pockets 20, 21. The second seal is formed by providing an annular recess 45 in the annular seat elements 24, 25 at one of these locations, appropriately shaped to accept a second ring seal. In FIGS. 9 and 10, the second seal is shown to include an O-ring seal 46 located as an outside diameter seal in an annular recess 45 formed in the outside diameter of the annular seat elements 24, 25 to seal to the side wall 23 of the seat pocket 20, 21.

The ring seals 42, 42a, 46, 50 and 54 and the bridge ring inserts 64 are non-metallic, generally made of suitable non-metallic seal materials such as elastomeric materials or thermoplastic materials. Most preferably, these seals are made from a thermoplastic material such as a polytetrafluoroethylene based material (Teflon® being an example) or a polyetheretherketone (PEEK) based material.

In the claims which follow, it should be appreciated that each of the above described tongue and groove seals, and the bridging seals function as a non-metallic bridging seal formed as a face seal between the first seal surface of each annular seat element and, either the radial base of the seat pocket, or the carrier ring if present. Each such bridging seal is adapted to bridge any gap formed at the first seal surface of the annular seat element such that sealing engagement is maintained across said gap at all times as the gate is moved between the open and closed positions, while still permitting the limited axial movement of the annular seat element.

All publications mentioned in herein are indicative of the level of skill in the art of this invention. All publications are herein incorporated by reference to the same extent as if each publication was specifically and individually indicated to be incorporated by reference. The terms and expressions used are, unless otherwise defined herein, used as terms of description and not limitation. There is no intention, in using such terms and expressions, of excluding equivalents of the features illustrated and described. Although the best mode contemplated for carrying out the present invention has been shown and described, it will be apparent that modification and variation may be made without departing from what is regarded to the subject matter of the invention.

I claim:

1. A gate valve for controlling fluid flow, comprising:
   a valve body forming a cylindrical flowbore extending through the body and a gate cavity intersecting the flowbore to provide opposed openings into the flowbore, the valve body forming a seat pocket in each of the opposed openings, each seat pocket having a radial base and a side wall;
   an optional metal carrier ring mounted in sealing relationship to the valve body in each seat pocket;
   a gate slidably movable across the flowbore within the valve body between an open and closed position, and having a planar face on each side;
   an annular seat element mounted in each seat pocket for limited axial movement therein on opposite sides of the gate, each seat element forming opposing seal surfaces, including a first seal surface for sealing against the radial base of the seat pocket or against the carrier ring if present, and a second seal surface for sealing against the planar face of the gate, the annular seat element maintaining sealing engagement between the gate and the seat pocket, or the carrier ring if present, as the gate is moved between its open and closed positions; and
   a non-metallic bridging seal formed as a face seal between the first seal surface of each annular seat element and, either the radial base of the seat pocket, or the carrier ring if present, said bridging seal being adapted to bridge any gap formed at the first seal surface of the annular seat element such that sealing engagement is maintained across said gap at all times as the gate is moved between the open and closed positions, while still permitting the limited axial movement of the annular seat element; wherein the bridging seal is a tongue and groove seal formed between the first seal surface of each annular seat element and, either the radial base of the seat pocket, or the carrier ring if present, the tongue and groove seal maintaining sealing engagement within the seat pocket while still permitting the limited axial movement of the annular seat element; and wherein either: the tongue of the tongue and groove seal is provided by an annular lip formed on either the radial base of the seat pocket, or the carrier ring if present, and the groove is provided by a non-metallic generally U-shaped ring seal sealed in a first annular groove provided in the first seal surface of the annular seat element opposite the annular lip; or the tongue of the tongue and groove seal is provided by an annular lip formed on the first seal face of the annular seat element, and the groove is provided by a non-metallic generally U-shaped ring seal seated in a first annular groove provided in either the radial base of the seat pocket, or the carrier ring, if present, opposite the annular lip.

2. The gate valve as set forth in claim 1, wherein each annular seat element is formed with a central bore aligned with the flowbore of the valve body such that the first seal surface of the annular seat element has a periphery edge opposite its flowbore edge; and wherein the gate valve further comprises a second ring seal as a) a corner seal at or adjacent the periphery edge of each annular seat element, b) a face seal on the first seal surface of the annular seat element, or c) an outside diameter seal at the outside diameter of the annular seat element.

3. The gate valve as set forth in claim 2, wherein the tongue of the tongue and groove seal extends into the groove with a depth that is greater than the limited axial movement permitted by the sum of all the gaps along the flowbore axis of the annular seat elements between the gate, the annular seat elements, the seat pockets and the carrier rings, if present.

4. The gate valve as set forth in claim 3, wherein the second ring seal comprises either
   a) an O-ring seal formed as a corner, face or outside diameter seal, or
   b) a second tongue and groove seal formed as a corner or face seal.

5. The gate valve as set forth in claim 4, wherein an annular recess is formed in the annular seat elements at or adjacent the periphery of the first seal surface, and the second ring seal is an O-ring seal held in the annular recess.

6. The gate valve as set forth in claim 4, wherein an annular recess which is generally L-shaped in cross section is formed at the periphery of the first seal surface, wherein the radial base, or the carrier ring if present, forms a second annular lip at its periphery, and wherein the second ring seal is a non-metallic L-shaped ring seal held in the annular recess to seal with the second annular lip in tongue and groove engagement.

7. The gate valve as set forth in claim 4, wherein:
   an annular recess which is generally L-shaped in cross section is formed at the periphery of the first seal surface,
   the radial base, or the carrier ring if present, forms a second annular lip adjacent its periphery, and
   the second ring seal is a non-metallic generally U-shaped ring seal held in the annular recess to seal with the second annular lip in tongue and groove engagement.

8. The gate valve as set forth in claim 4, wherein:
   the radial base, or the metal carrier ring if present, forms a second annular lip between the first annular lip and the periphery of the radial base or the metal carrier ring if present,
   an annular recess in the form of a second annular groove is formed in the first seal surface intermediate its periphery and the first annular groove at a location to mate with the second annular lip; and
   the second ring seal is a non-metallic generally U-shaped ring seal held in the second annular groove for sealing in tongue and groove engagement with the second annular lip.

9. The gate valve as set forth in claim 4, wherein an annular recess is formed on the outside diameter of the annular seat elements adjacent the side wall of the seat pocket, and the second ring seal is an O-ring seal held in the annular recess.

10. The gate valve as set forth in claim 1, wherein the radial base, or the carrier ring if present, is formed with secondary annular grooves to accept the leg portions of the generally U-shaped ring seals.

11. The gate valve as set forth in claim 4, wherein the ring seals of the tongue and groove seal and the second seal are formed of a thermoplastic material.

12. The gate valve as set forth in claim 4, wherein the second ring seal is weakened so as to allow pressure build up between the tongue and groove seal and the second seal to dissipate more quickly.

13. The gate valve as set forth in claim 12, wherein the carrier rings, if present, may include a ring seal to the radial base of the seat pocket.

14. The gate valve as set forth in claim 11, wherein the ring seals are formed of a polytetrafluoroethylene based material or a polyetheretherketone based material.

* * * * *